No. 708,085. Patented Sept. 2, 1902.
C. G. SINGLEY.
CIGAR SHAPER.
(Application filed July 16, 1902.)
(No Model.)
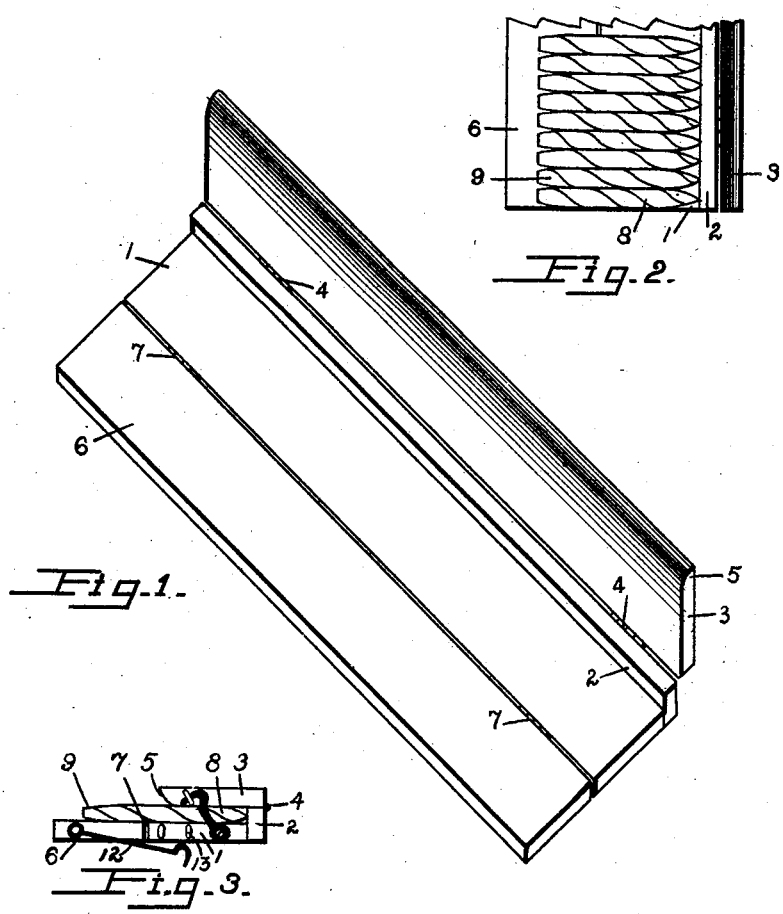
WITNESSES:
INVENTOR
Christian G. Singley.
BY
ATTORNEY.

UNITED STATES PATENT OFFICE.

CHRISTIAN G. SINGLEY, OF MANHEIM, PENNSYLVANIA.

CIGAR-SHAPER.

SPECIFICATION forming part of Letters Patent No. 708,085, dated September 2, 1902.

Application filed July 16, 1902. Serial No. 115,751. (No model.)

*To all whom it may concern:*

Be it known that I, CHRISTIAN G. SINGLEY, a citizen of the United States, and a resident of Manheim, in the county of Lancaster and State of Pennsylvania, have invented certain Improvements in Cigar-Shapers, of which the following is a specification.

This invention relates to improvements in that class of devices whereby cigars are given a peculiar shape; and the object of the invention is to give a fanciful shape to fully-made cigars.

The invention consists in the construction and combination of the various parts, as hereinafter fully described and then pointed out in the claims.

In the accompanying drawings, forming a part of this specification, Figure 1 is a front perspective view of a shaper embodying my invention, the lid and the shaping-plate being shown in an open position, the hooks and staples being omitted; and Fig. 2, a top plan view of an end thereof, the parts being shown in the same position as seen in Fig. 1, but with cigars in place ready to be shaped. Fig. 3 is an end view showing the lid clamped down over the cigars; and Figs. 4 and 5 similar views, but showing the shaping-plate respectively in a partially and in an entirely closed position.

Similar numerals indicate like parts throughout the several views.

Referring to the details of the drawings, 1 indicates the bottom of the shaper, and 2 the back, rigidly secured to the bottom.

3 is the lid, hinged at 4 to back 2 and having its swinging edge 5 beveled, as shown.

6 is the shaping-plate, hinged at 7 to the front edge of the bottom.

In operation, the lid and the shaping-plate being in an open position, the cigars 8 to be shaped are laid side by side on and transversely of bottom 2, the tuck end 9 thereof extending over onto the shaping-plate, as shown in Figs. 1 and 2. The lid is then secured in a closed position by a hook 10 and a staple 11. Then the free edge of the shaping-plate is raised, bending the tuck ends of the cigars upward. Shaping-plate 6 may be partially turned up, as shown in Fig. 4, or it may be turned until it is in an upright position, as seen in Fig. 5, and it may be held in a raised position by hooks 12 and staples 13, or by any other suitable device. The lid holds the bodies of the cigars in a fixed position while the tucks are being bent upward, the bevel 5 of its swinging edge preventing the upper side of the cigars from being cut or broken. It is not necessary that the shaping-plate be held in the position attained thereby after giving the desired bend to the cigars, as after said bend is made the cigars may be immediately placed in boxes suitably constructed to maintain the bend therein, nor is it necessary that there be mechanical means for securing the lid in a closed position, for it may be held down by hand as the shaping-plate is turned upward.

My shaper not only gives a fanciful shape to the cigars, but said shape demonstrates to the purchaser that the cigars are made with long fillers, for cigars having scrap fillers cannot be so bent without breaking.

I do not confine myself to the details of construction herein shown and described, as it is obvious that alterations may be made therein without departing from the principle and scope of my invention.

Having thus described my invention, what I claim as new, and desire to secure by Letters Patent, is—

1. The combination, in a cigar-shaper, of a bottom plate, a back on the bottom plate, a lid hinged to the back, and a shaping-plate hinged to the front of the bottom plate, for the purpose specified.

2. The combination, in a cigar-shaper, of a bottom plate, a back on the bottom plate, a lid hinged to the back, means for securing the lid in a closed position, and a shaping-plate hinged to the front of the bottom plate, for the purpose specified.

3. The combination, in a cigar-shaper, of a bottom plate, a back on the bottom plate, a lid hinged to the back and having the swinging edge thereof beveled, and a shaping-plate hinged to the front of the bottom plate, for the purpose specified.

4. The combination, in a cigar-shaper, of a bottom plate, a back on the bottom plate, a lid hinged to the back, means for securing the lid in a closed position, a shaping-plate hinged to the front of the bottom plate, and means for securing the shaping-plate in a raised position, for the purpose specified.

5. The combination, in a cigar-shaper, of a bottom plate, a back on the bottom plate, a lid hinged to the back and having the swinging edge thereof beveled, the hook 10 and the staple 11, a shaping-plate hinged to the front of the bottom plate, and the hooks 12 and the staples 13, for the purpose specified.

CHRISTIAN G. SINGLEY.

Witnesses:
   C. G. BASSLER,
   WM. R. GERHART.